United States Patent [19]

Butkovich et al.

[11] Patent Number: 5,025,946
[45] Date of Patent: Jun. 25, 1991

[54] ANTI-THEFT DEVICE FOR TANK OPENINGS

[75] Inventors: Michael S. Butkovich, Aurora; Gerard V. LaLonde, Naperville, both of Ill.; Irwin Ginsburgh, Newhall, Calif.

[73] Assignee: Amoco Corporation, Chicago, Ill.

[21] Appl. No.: 574,457

[22] Filed: Jul. 29, 1990

[51] Int. Cl.⁵ .............................................. B65D 51/18
[52] U.S. Cl. ..................................................... 220/86.3
[58] Field of Search ............... 220/85 R, 85 F, 85 SP, 220/86.2, 86.3

[56] References Cited

U.S. PATENT DOCUMENTS

| | | | |
|---|---|---|---|
| 1,933,486 | 10/1933 | Simmonds et al. | 220/86.3 |
| 1,976,975 | 10/1934 | Williams | 220/86.3 |
| 1,984,590 | 12/1934 | Maddin | 220/86.3 |
| 2,281,448 | 4/1942 | Mathey | 220/86.3 |
| 2,313,266 | 3/1943 | Roberts | 220/86.3 |
| 3,016,162 | 1/1962 | Cioffi | 220/86.3 |
| 3,951,297 | 4/1976 | Martin | 220/86.3 |
| 4,326,641 | 4/1982 | Wilken | 220/86.3 |
| 4,650,087 | 3/1987 | White | 220/86.3 |

Primary Examiner—Joseph Man-Fu Moy
Attorney, Agent, or Firm—Thomas W. Tolpin; William H. Magidson; Ralph C. Medhurst

[57] ABSTRACT

The anti-theft device for use in a liquid storage tank having an opening in an upper wall of the tank for receiving and mounting an access fill pipe which receives therein a drop tube having an access port. The anti-theft device comprises a mounting ring; a plug; a truncated porous hollow cone having a larger upper end fixed to the mounting ring and a smaller lower end fixed to the plug which is disposed generally concentric with the elongate axis of the drop tube. The plug may also be provided with a shaped key-way opening to allow gauging of liquid contents of a storage tank with a gauge level stick. The mounting ring of the truncated porous hollow cone is attached to the drop tube within the access fill pipe at a point below the access port of the drop tube and above the upper wall of the storage tank. The key-way opening of the plug can be T-shaped, cross-shape, C-shape, or of a circular-shape.

13 Claims, 4 Drawing Sheets

ANTI-THEFT DEVICE FOR TANK OPENINGS

BACKGROUND OF THE INVENTION

1. Field of the Invention

The present invention is related to an improvement in anti-theft devices for liquid storage receptacles, tanks, and the like and more particularly, an anti-theft device that limits unauthorized access to a storage tank's contents without obstructing daily operations, such as product delivery, inventory control, and attendant normal activities of filling, gauging, and sampling of the tank's contents.

2. Description of the related art including information disclosed under 37 CFR Sections 1.97–1.99

Liquid storage tanks commonly have openings on their tops, some of which are quite large. These openings are normally used by authorized personnel to fill storage tanks, gauge the storage tank's contents, and sample the contents. Unfortunately, these same openings in liquid storage receptacles, tanks, hatches, or the like may also provide quick and easy access for would-be thieves to siphon the liquid contents.

An example of this type of tank opening can be found on the underground gasoline and diesel tanks currently used at many service stations. Theft of fuel product directly from an underground tank may be attempted through a fill pipe to such tanks. Traditional theft deterrents at the fill pipe, such as locking the fill cap, although of marginal success in the past, are not without attendant problems. Locks are generally considered unacceptable because keys can be lost or stolen, duplicated for use by unauthorized personnel, combinations may be difficult to keep track of and are normally forgotten, and locks tend to freeze with dirt, snow, and ice in cold weather. Further, locks external to the fill pipe may become the object of tampering or mutilation in an attempt to by-pass the same.

Anti-theft devices for use in a fill pipe for a liquid storage tank further should not obstruct daily operations relative to the tank such as product delivery and inventory control. Such normal operations routinely require tank gauging often performed with the usage of a level gauge stock to determine the volume or amount of liquid contents to the storage tank. Often, storage tank adapters or closures are designed to prevent siphoning of liquid storage tank contents while allowing for tank filling yet have no provision or ability to allow for tank gauging. Examples of such adapters or closures unable to accommodate tank gauging include U.S. Pat Nos. 1,512,065 to Taylor, 1,813,554 to Wickline, 1,933,486 to Simmonds et al., 2,006,748 to Ritz-Woller, 2,313,266 to Roberts, 2,372,545 to Breedlove, and 3,951,297 to Martin.

U.S. Pat. Nos. 1,750,849 to Malluk, 1,977,935 to Caldwell, and 1,978,313 to Lancaster are examples of art which allow tank gauging but require locks external to a fill pipe to provide tank access security.

In U.S. Pat. Nos. 1,766,916 to MacLiver and 1,862,016 to Houck there are disclosed devices capable of allowing gauging of a liquid tank without requiring locking to provide tank access security. The former patent to MacLiver discloses a gasoline theft proof device which functions as a receptacle which extends substantially to the bottom of a tank and incorporates a small opening or bleed hole to allow the receptacle liquid level to equilibrate to the tank level for gauging purposes. In the latter patent to Houck there is disclosed an automobile gasoline tank baffle which is mounted to the upper end of a neck of a tank fill pipe by threaded engagement or via three exterior screws which penetrate the fill neck and baffle. A cap is held in place by a spring clip over the open top of the tank baffle. A diametrical opening is made across the bottom wall of the baffle to allow extension of a measuring stick therethrough to gauge the contents of the storage tank.

SUMMARY OF THE INVENTION

The anti-theft device for tank openings of the present invention is designed to prevent siphoning or theft from a fill pipe of a liquid storage tank without obstructing normal operations of filling, gauging, and sampling involved in product delivery and inventory control The device includes a truncated porous hollow cone, the larger upper end of which is integral with a mounting ring and the smaller lower end of which is integral to a plug having a shaped key-way opening. The mounting ring is riveted to a drop tube of a fill pipe at a point below the access port of the fill pipe and above the upper tank wall of a liquid storage tank. The shaped key-way opening of the cone plug will deter siphoning of the liquid storage tank contents by preventing any tube of one-quarter inch outer diameter or greater from passing through the key-way.

However, the key-way will allow passage of an appropriately shaped measurement stick to gauge the tank contents and allow for the passage of a small tube less than one-quarter inch outer diameter to obtain a sampling of the tank contents.

According to the invention, there is provided an anti-theft device for use in a liquid storage tank having an opening in an upper wall of the tank for receiving and mounting an access fill pipe which receives therein a drop tube having an access port, the device comprising: a mounting ring; a plug; a truncated porous hollow cone having a larger upper end fixed to the mounting ring and a smaller lower end fixed to the plug which is disposed generally concentric with the elongate axis of the drop tube, and means for attaching the mounting ring of the truncated porous hollow cone to the drop tube within the access fill pipe at a point below the access port of the drop tube and above the upper wall of the storage tank.

Additional features and advantages of the present invention will become apparent to those skilled in the art from the following description and the accompanying Figure of the drawing illustrating the preferred embodiment of the invention, the same being the present mode for carrying out the invention.

DESCRIPTION OF THE PREFERRED EMBODIMENT

Figure 1:
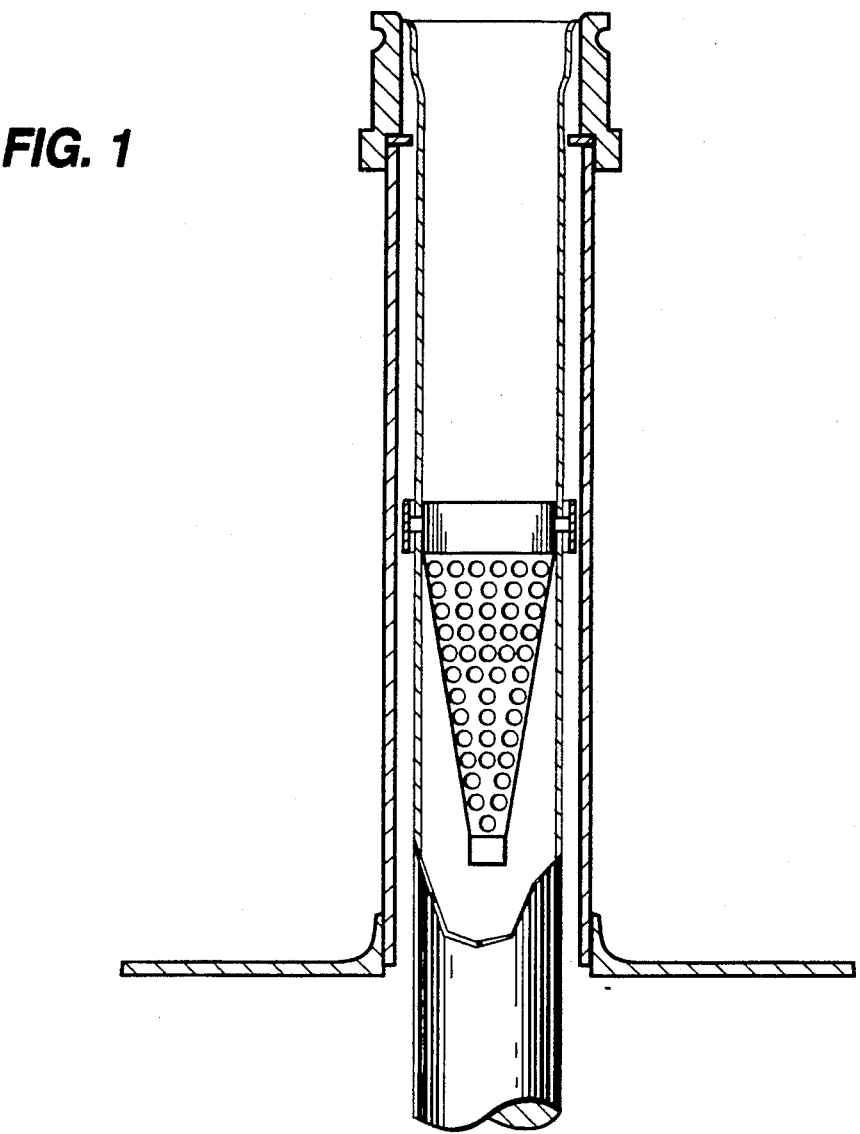
FIG. 1 is a side elevational view, partly in vertical section, of an anti-theft device for tank openings constructed according to the teachings of the present invention and shows a truncated porous hollow cone integral at its upper end to a mounting ring attached to a drop tube and integral at its lower end to a key-way plug.
Figure 1:
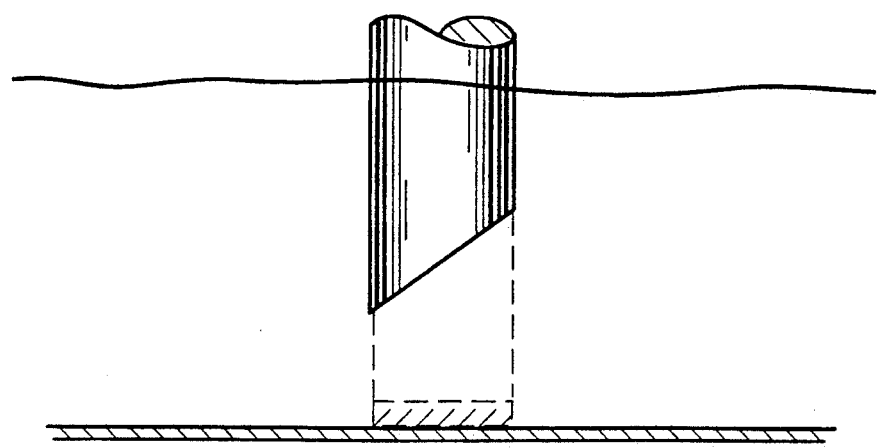

Referring now to the drawings, in greater detail, there is shown in FIG. 1 a side elevational view, partly in vertical section, of an anti-theft device 10 for a liquid storage tank 11 having an inlet opening 12. The anti-theft device 10 is received in a drop tube 14 located within and coaxial with a fill pipe 16 mounted in the tank inlet opening 12. The anti-theft device 10 includes a truncated porous hollow cone 18 having a larger upper end 20 fixed to a mounting ring 22 which is attached to a vapor space blocking ring 23 through the wall of the drop tube 14. A smaller lower end 24 of the cone 18 is fixed to a key-way plug 26. The anti-theft device 10 is disposed within the drop tube 14 and the mounting ring 22 thereof is attached to the drop tube 14 at a point below a hose adaptor 25 and above the upper tank wall 27 of the liquid storage tank 11.

If desired, a tank bottom protector 28 with guide rails 29 can be provided at the bottom of the drop tube 14 for protecting the bottom 31 of the tank 11 from impact by a gauge stick.

Figure 2:
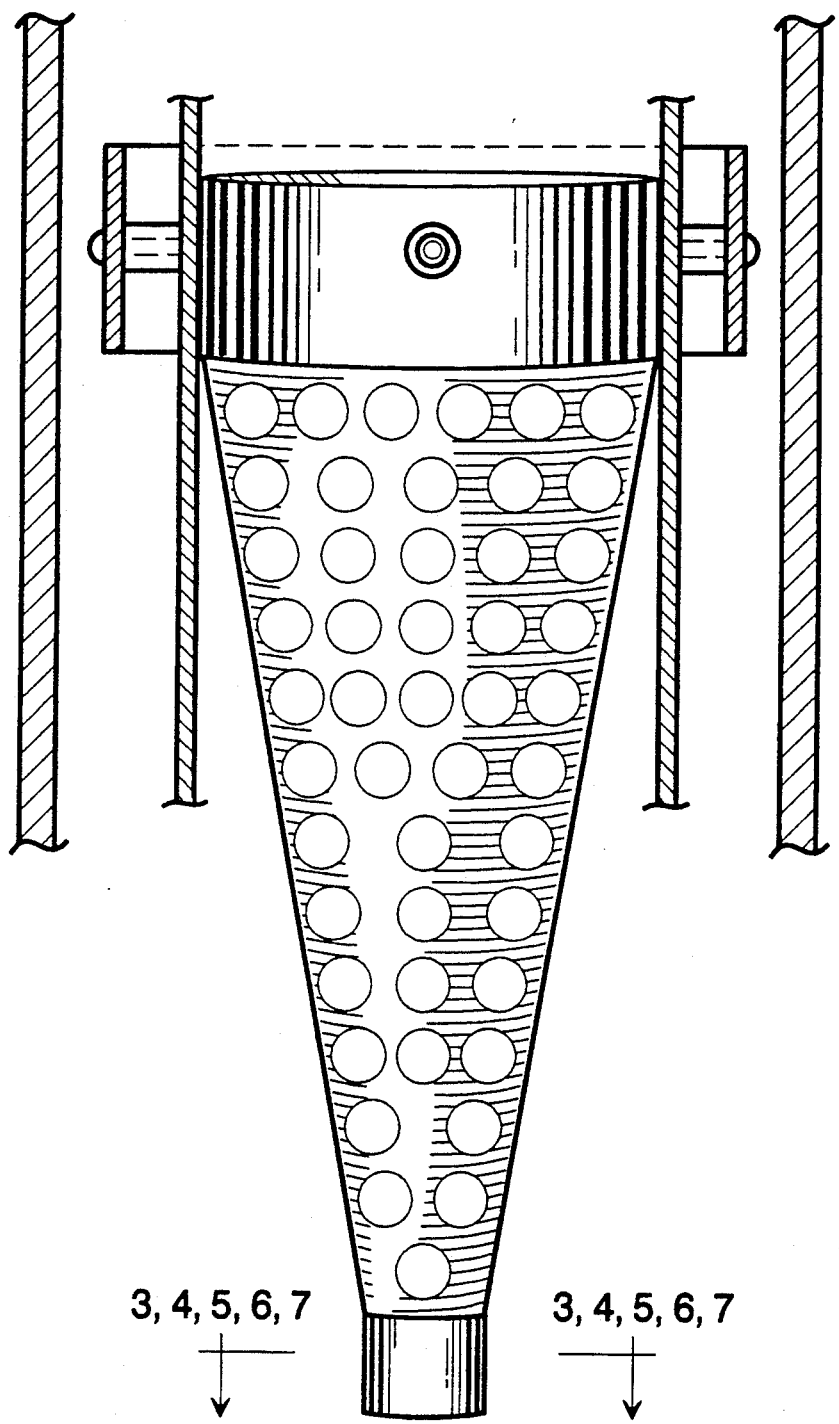
FIG. 2 is a perspective view of the truncated porous hollow cone integral at its larger upper end to the mounting ring and integral at its smaller lower end to the key-way plug.

In FIG. 2 there is shown a side perspective view of the truncated porous hollow cone 18 with the larger upper end 20 fixed to the mounting ring 22 and the smaller lower end 24 fixed to the key-way plug 26 having a cross-shaped key-way opening 30 (FIG. 4) or other shaped opening (FIGS. 3, 5, 6 and 7).

The truncated porous hollow cone 18 has a plurality of holes 32 disposed around and through a conical wall 34 of the cone 18 between the mounting ring 22 and key-way plug 26 to form the wall 34 as a screen.

As shown in FIG. 1, drop tube tabs 40 are mounted on the drop tube 14 and the hose adaptor 25 is mounted on the upper end of the fill pipe 16 for retaining the drop tube 14 to the fill pipe 16. The tabs 40 are trapped between the top 41 of the fill pipe 16 and the hose adaptor 40 for holding the drop tube 14 to the fill pipe 16.

As shown in FIG. 2, approximately half way down the length of the fill pipe 16, the anti-theft device 10 is fixed to the drop tube 14 by rivets 51, which can be pop rivets. The vapor space blocking ring 23 is situated outside of the drop tube 14 in between the drop tube 14 and the fill pipe 16. Then at points equally spaced about the mounting ring 22, the annular vapor space blocking ring 23 is fixed by the rivets 51, each of which extends through an opening in the annular ring 23, through a cylindrical spacer 62, through the wall of the drop tube 14 and then through an opening in (and fixed to) the annular mounting ring 22

A space 70 between the drop tube 14 and the fill pipe 16 forms a path for vapor to escape from the tank as a hydrocarbon product is poured into the tank 11 through the drop tube 14 and the anti-theft device 10.

An advantage of the anti-theft device 10 of the present invention is that the locating of the annular ring 23 with the spacers 62 at a location approximately midway between the drop tube 14 and the access fill pipe 16 allows the annular ring 23 to form a blockage for blocking insertion of a theft tube through the vapor escape space 70.

At the same time, the cone 18, having circular holes 32 therethrough disposed in the wall 34 of the cone 18 at a steep angle inclined to the vertical, prevents the insertion of a large size theft tube and limits the size of tube that can be inserted therethrough to the size of the holes.

The circular shape of the holes 32 was selected due to the ready availability of sheet metal having such holes 32. Moreover, the relative strength of the material, such as sheet metal, with circular holes 32 is considered to be better than slotted holes which would be more subject to distortion of the webbing of material between the slots and thus more vulnerable to opening a passage for introduction of a theft tube for removal of the product With respect to the size of the holes 32, it is desirable that the holes be small enough to preclude tubes from being inserted through the wall 34 of the cone 18, which wall 34 is in the form of a screen, while at the same time maintaining good strength, good flow and low cost.

The length of the cone 18 and the angle of the cone 18 to the vertical can be varied as desired, it being understood that it is desirable to provide easy use of a gauge stick through the anti-theft device 10 and to configure the cone 18 so as to minimize the tendency of the gauge stick to catch in or on the screen wall 34 perforations or holes 32 of the screen wall 34. In this respect, a small angle to the vertical is preferred over a large angle to the vertical.

The size of the key-way opening 30 is dependent upon the size of available gauge sticks and is chosen by considering potential theft of product cost versus the cost of the gauge stick, particularly if it is a specially sized fabricated gauge stick.

Figure 4:
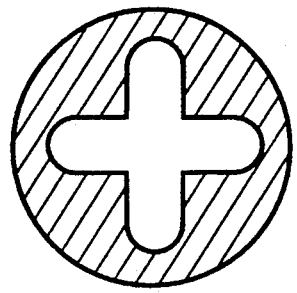
FIG. 4 is a bottom plan view of a key-way plug of a truncated porous hollow cone having a cross-shape key-way opening.

As shown in FIG. 4, one preferred shape of a key-way opening 30 in the plug 26 is a cross-shaped opening 30. However, other shapes can be utilized.

Figure 3:
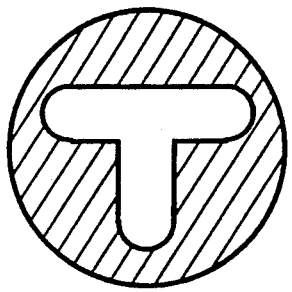
FIG. 3 is a bottom plan view of a key-way plug of a truncated porous hollow cone having a T-shape key-way opening.

In this respect, as shown in FIG. 3, an alternate key-way opening 80 can be a T-shaped key-way opening 80.

Figure 5:
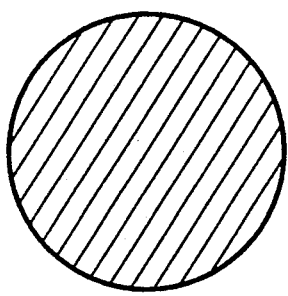
FIG. 5 is a bottom plan view of a plug of a truncated porous hollow cone having no key-way opening.

Alternatively, as shown in FIG. 5, the plug 26 can be solid without providing for access of a gauge stick so that the anti-theft device 10 can be used with remote electronic gauging systems.

Figure 6:
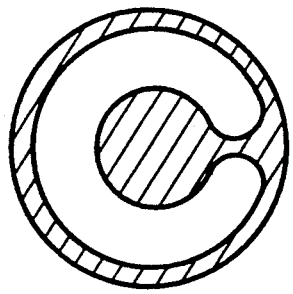
FIG. 6 is a bottom plan view of a key-way plug of a truncated porous hollow cone having a C-shaped key-way opening.
Figure 7:
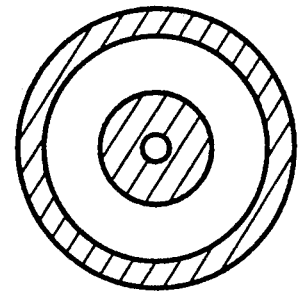
FIG. 7 is a bottom plan view of a key-way plug of a truncated porous hollow cone having a circular-shape key-way opening.

Other key-way shapes or cross-sections are shown in FIGS. 6 and 7 where FIG. 6 shows a C in-cross-section shaped key-way opening 90, for receiving a C in-cross-section gauge stick and FIG. 6 shows a cylindrical or round in-cross-section key-way opening 100 for receiving a round gauge stick.

All key-way openings 30, 80, 90 or 100 of the plug 26 of the truncated porous hollow cone 18 allow gauging of the liquid contents of a storage tank by a gauging measuring stick shaped and dimensioned to pass through the shaped key-way opening 30, 80, 90 or 100 to gauge the liquid contents of the storage tank 11 located below the shaped key-way opening Further, all key-way openings 30, 80, 90 or 100 are designed to prevent the passage of a theft suction tube one-quarter inch or more in outer diameter, thus providing security to the contents of the liquid storage tank 11 located below tee key-way opening 30, 80, 90 or 100. Nevertheless, a small suction tube of less than one-quarter inch outer diameter can be introduced through the key-way opening for purposes of obtaining a small sample of the liquid contents of the storage tank 11. Such small draw tubes, however, may be regarded as insufficient to siphon a large amount of the liquid contents of the storage tank 11.

The design of the anti-theft device 10 for liquid storage tank openings of the present invention thus provides an effective deterrent to theft of the liquid contents of a storage tank by means of a theft tube of one-quarter inch or greater in outer diameter in a passive way without resorting to locks or covers while at the same time allowing for normal product delivery and inventory control operations of: filling, gauging, and sampling relative to the storage tank 11

By attaching the mounting ring 22 to a drop tube 14 within the access fill pipe 16 of the storage tank 11, the anti-theft device 10 is internally isolated from a would-be thief to prevent bolt cutting or tampering or other destruction or mutilation of the attachment means for purposes of removing or by-passing the anti-theft device 10. Further, the porous nature of the truncated hollow cone 18 allows a minimum of interference with the fill rate through access fill pipe 16.

Figure 8:
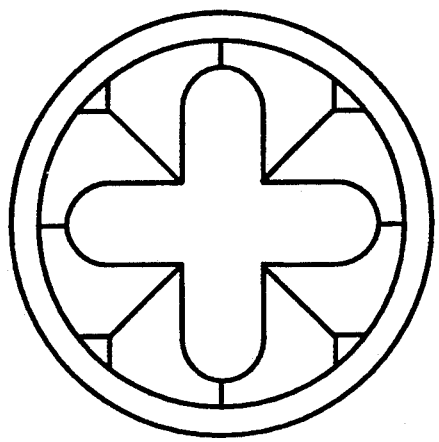
FIG. 8 is a top plan view of one preferred embodiment of a key-way plug having a cross-shaped key-way opening therein.
Figure 9:
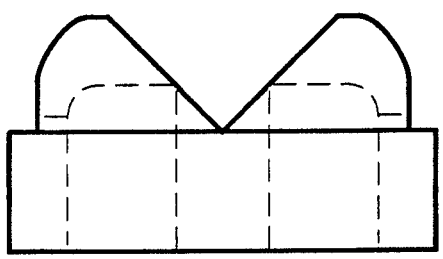
FIG. 9 is a side elevational view of the key-way plug shown in FIG. 8.
Figure 10:
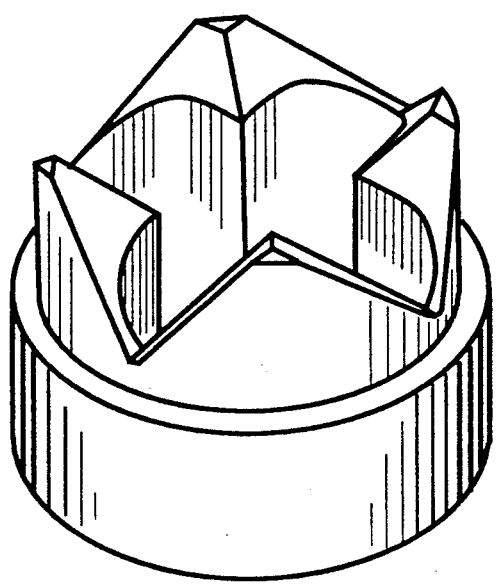
FIG. 10 is a perspective view of the key-way plug shown in FIGS. 7 and 8.

One preferred plug 126 is shown in FIGS. 8, 9 and 10 and has a cross-shape key-way opening 130 and four bosses 132-135 extending upwardly from an upper side of the plug 126. Each boss 132-135 has at least one, and preferably two, ramps on inclined surfaces 138, 140 for guiding a gauge stick into the cross-shape key-way opening 130.

It is believed that the anti-theft device 10 of the present invention in its described embodiment and with its numerous attendant advantages will be fully understood from the foregoing description, and that changes may be made in form, construction, and arrangement of the parts thereof without departing from the teachings of the invention, or sacrificing any of the attendant advantages.

For example, the drop tube 14 can be part of the anti-theft device as well as the hose adapter 25 which is then fixed to the upper end of the fill pipe 16.

The structures herein disclosed are preferred embodiments for the purpose of illustrating the invention and disclosing the mode contemplated by the inventors for carrying out the invention. Accordingly, the scope of the invention is only to be limited as necessitated by the accompanying claims.

We claim:

1. An anti-theft device, for use in a liquid storage tank having an opening in an upper wall of the tank for receiving and mounting an access fill pipe which receives therein a drop tube having an access port:
    a mounting ring;
    a plug;
    a truncated porous hollow cone having a larger upper end fixed to said mounting ring and a smaller lower end fixed to said plug which is disposed generally concentric with the elongate axis of the drop tube; and
    means for attaching said mounting ring of said truncated porous hollow cone to the drop tube within the access fill pipe at a point below the access port of the drop tube and above the upper wall of the storage tank.

2. The anti-theft device of claim 1 wherein said truncated porous hollow cone has a plurality of circular holes disposed around and in the wall of said hollow cone between said mounting ring and said plug.

3. The anti-theft device of claim 1 wherein said plug has a shaped key-way opening to allow gauging of liquid contents of a storage tank with a gauge level stick.

4. The anti-theft device of claim 2 wherein said plug has a T-shape key-way opening.

5. The anti-theft device of claim 2 wherein said plug has a cross-shape key-way opening.

6. The anti-theft device of claim 2 wherein said plug has a C-shaped key-way opening.

7. The anti-theft device of claim 2 wherein said plug has a circular-shaped key-way opening.

8. The anti-theft device of claim 1 wherein said means for attaching said mounting ring of said truncated porous hollow cone to the drop tube comprises rivets which are used to rivet said fitting ring to the drop tube.

9. The anti-theft device of claim 1 including an annular, tube insertion blocking ring situated in the vapor-escape forming space between the drop tube and the access fill pipe and means for spacing said annular ring from the drop tube.

10. The anti-theft device of claim 9 wherein said attaching means includes rod means received through said spacing means.

11. The anti-theft device of claim 10 wherein said rod means comprises at least three rivets and said spacing means comprises at least three generally cylindrical spacers.

12. The anti-theft device of claim I including a tube which replaces the drop tube and which has an upper hose adaptor fitting thereon and said tube having said mounting ring and said cone mounted therein.

13. The anti-theft device of claim 1 wherein said plug has a cross-shape key-way opening therein for allowing a gauging stick to be inserted into the tank for gauging the contents thereof and boss portions on an upper side of said plug, each of said boss portions having at least one inclined surface for guiding a gauging stick into said key-way opening.

* * * * *

UNITED STATES PATENT OFFICE
CERTIFICATE OF CORRECTION

Patent No. __5,025,946__    Dated __June 25, 1991__

Inventor(s) __Michael S. Butkovich, Gerard V. LaLonde, Irwin Ginsburgh__

It is certified that error appears in the above-identified patent and that said Letters Patent is hereby corrected as shown below:

| Col. | Line | |
|---|---|---|
| 1 | 44 | "stock" should read --stick-- |
| 2 | 15 | "control The" should read --control. The-- |
| 5 | 5 | "tee" should read --the-- |
| 6 | 47 | "claim I" should read --claim 1-- |

Signed and Sealed this

Twentieth Day of October, 1992

*Attest:*

DOUGLAS B. COMER

*Attesting Officer*    Acting Commissioner of Patents and Trademarks